United States Patent
Murakami

[11] Patent Number: 5,806,183
[45] Date of Patent: Sep. 15, 1998

[54] MANUFACTURING METHOD FOR OFFICE AUTOMATION EQUIPMENT HOLLOW SHAFT MEMBER

[76] Inventor: Yukiyoski Murakami, 11-16, Minamiurawa 3-chome, Urawa-shi, Saitama-ken, Japan

[21] Appl. No.: 712,116

[22] Filed: Sep. 11, 1996

[51] Int. Cl.⁶ .................................................. B23P 15/00
[52] U.S. Cl. ............................................ 29/895.2; 492/47
[58] Field of Search .............................. 492/47; 29/495.2, 29/508, 512, 515, 516

[56] References Cited

U.S. PATENT DOCUMENTS

| | | |
|---|---|---|
| 4,452,141 | 6/1984 | Mistyurik .................................. 492/47 |
| 5,469,619 | 11/1995 | Renck ........................................ 492/47 |
| 5,490,458 | 2/1996 | Stuart ........................................ 492/47 |
| 5,598,600 | 2/1997 | Stegens .................................... 492/47 |

*Primary Examiner*—Irene Cuda
*Attorney, Agent, or Firm*—Wallace G. Walter

[57] ABSTRACT

A hollow shaft member having an end member (end piece) joined to either of its ends for installation in office automation equipment, in which, an end member of soft metal is inserted in the inner wall end of a hollow shaft member formed of hard metal and, the edge member is pressed after press-fit insertion into a portion of the hollow shaft member and, at the same time the end member is deformed by stress and, due to the pressure from the deformation, the hollow shaft member at the outer side of the end member is made to expand within a range such that the internal radial expansion δ is:

$$\delta = a^2/t \cdot P/E(1-\nu/2).$$

1 Claim, 6 Drawing Sheets

MANUFACTURING METHOD FOR OFFICE AUTOMATION EQUIPMENT HOLLOW SHAFT MEMBER

BACKGROUND OF THE INVENTION

1. Field of the Invention

This invention relates to a hollow shaft member used with paper feed rollers and print head carriages in office automation machines such as copiers, word processors, and facsimiles. More particularly, this invention relates to a method and device for manufacturing the hollow shaft member with an end member (end piece) joined to at least one end of the hollow shaft member so as to be installed in a machine frame or joined to motors.

2. Description of the Related Art

Shaft members typically used in general machines such as air conditioners and office equipment such as copiers, word processors and facsimiles conventionally have a solid shaft. In recent years however, hollow shaft members have been developed with the goal of lighter weight and a reduction in costs by means of economizing on materials.

To install the hollow shaft member in the machine frame or join it to the motor, as shown in FIG. 8, the end members have to be inserted into the left and right ends of the shaft member, and then a locking pin press-fit into an insertion pin hole drilled half-way of the shaft member.

However this method has a problem in that variations are prone to occur in the dimensions of the inner wall of the hollow shaft member, and end members having large variations in accuracy are inserted into the hollow shaft member so that the end member tends to be fixed crookedly versus the longitudinal axis of the hollow shaft member with no concentricity. A further problem is that firmly clamping the hollow shaft member to the end member is difficult with both members tending to loosen.

As a result for example, play occurs when the hollow shaft is rotated. In the process of manufacturing a paper feed roller for a copier, a rubber roller is mounted on this hollow shaft. However when this hollow shaft is rotated to fit the rubber roller therewith, a problem occurs because the resulting play prevents manufacture of a completely circular rubber roller.

Another disadvantage is that when using hollow shafts for carriages in print heads for word processors, when the end member is not sufficiently secured, the vibration of the print head is accompanied by large shaking which makes the print appear ragged.

Therefore maintaining dimensional precision to strict standards and strongly securing both the hollow shaft members and end members is essential during their manufacture. However there is a certain limit due to technical reasons in trying to improve the dimensional precision of the hollow shaft members and end members and attempts to raise precision bring further problems involving the need for complex processes and increased costs.

SUMMARY OF THE INVENTION

It is an object of this invention to provide means to resolve the above problems by an extremely simple method with satisfactory finish dimension precision and a strong coupling of the hollow shaft member and the end member.

Manufacturing method of this invention for the hollow shaft member for office automation products, of which, an end portion of soft metal is inserted in the inner wall end of a hollow shaft member formed of hard metal and, the edge portion is pressed after press-fit insertion into a portion of the hollow shaft member and, at the same time the end member is deformed by stress and, due to the pressure from the deformation, the hollow shaft member at the outer side of the end member is made to expand within a range such that the internal radial expansion δ is:
where, $$\delta = a^2/t \cdot P/E(1-\nu/2)$$

a: shaft internal radius
P: internal pressure
ν: Poisson's ratio
t: shaft wall thickness
E: Young's modulus A frame mold unit as part of the manufacturing device comprises a support base, a lower mold, an upper mold, and a top plate, with elastic material members sandwiched between the support base and the lower mold and between the upper mold and top plate, so as to form a circular hole such that the internal radial expansion δ is:
where, $$\delta = a^2/t \cdot P/E(1-\nu/2)$$

a: shaft internal radius
P: internal pressure
ν: Poisson's ratio
t: shaft wall thickness
E: Young's modulus and that the press-in member inserted in the upper mold and pressed by the top plate and, the press-in members inserted in the lower mold and supported at their bottom ends by the support base, are arranged to focus towards the center of the circular hole.

The hollow shaft member of this invention is a term used for the rod-shaped member used in office automation equipment such as word processors, facsimiles and copiers. The hollow shaft member acts as a rotating axis for a paper feed roller linked to the gear of a drive motor used in facsimiles and copiers and is also used as part of the carriage for moving the print head in word processors.

In the oblique view shown in FIG. 1, the reference numeral 1 denotes a hollow shaft member using a metal of relatively high hardness such as SUS304 with hardness of HV260. In the manufacturing method, a steel plated roller of suitable width is applied to the metal several times flexing it and finally forming a cylindrical shape. Said hollow shaft maintains the specified outer diameter dimensions and precision defined by the roller but the inner diameter dimensions tend to have non-uniformities.

The reference numeral 2 denotes the end member for joining one end, or joining the left and right end of the hollow shaft 1. The end member 2 is made of a relatively soft metal such as aluminum with hardness of HV120 or brass. In FIG. 2, a guide 2a is formed at the tip of the end member 2 for easy insertion of the hollow shaft member 1. A body 2c and a flange 2 are further provided.

Said body 2c preferably makes as close a contact as possible with the inner wall surface of the hollow shaft 1 however in this invention a fixed amount of tolerance is allowed for dimensional accuracy provided the body 2c can be inserted in the hollow shaft 1.

All flat surfaces can be formed for the body 2c, however at the entrance, a beveled surface of the taper 2b can be formed as shown in FIG. 2. If a taper 2b is formed in the body 2c, the beveled surface of the taper 2b makes contact when inserting the end member 2 inside the hollow shaft member 1 and the soft material of the end member is trimmed down while being press-fit into the hard material of the hollow shaft member 1, allowing a close fit between the end member 2 and the hollow shaft member 1 (see FIGS. 2, 3 and 4). The body 2d is press-fit upon then being inserted into the hollow shaft member 1 and a collection groove in the press-fit portion allows cutting scraps from the taper 2b to be collected.

Next, after fitting the end member 2 into the hollow shaft member 1, a frame mold unit 10 is fabricated as shown in FIG. 5 and the hollow shaft 1 inserted with the end member 2, is inserted into the frame mold unit 10. In the frame mold unit 10, the support base 11 is placed on a base plate and a rubber mount 13 is placed between the support base 11 and a lower mold 12. A guide rod 14 is installed on a support base 11a, and an insertion hole 12a is drilled in the lower mold 12.

A rubber mount 16 is further placed between a top plate 18 and the upper mold 15 and a guide rod 17 is installed on the lower mold 12. An insertion hole 15a is drilled in the upper mold 15.

Between the lower mold 12 and the upper mold 15, a specified gap is maintained versus the outer side of the hollow shaft 1, in order to allow for a specified expansion of the outer dimensions of the hollow shaft 1, thus forming the semi-circular holes 12b and 15b.

This fixed gap having an internal radial expansion δ calculated to obtain a figure:
where, $$\delta = a^2/t \cdot P/E(1-v/2)$$

a: shaft internal radius
P: internal pressure
v: Poisson's ratio
t: shaft wall thickness
E: Young's modulus Then, the press-in member 19a inserted in the upper mold 15 and pressed by the top plate 18 is arranged to face the center of the circular hole 15b. Further, the press-in members 19b and 19c are inserted in the lower mold 12 and supported at their bottom ends by the support base 11, are symmetrically arranged so their tips protrude facing the center of the circular hole 12b.

The hollow shaft member 1 fitted with the end member 2 is inserted into the circular holes 12b and 15b of the frame mold unit 10 and the top plate 18 of the upper mold 15 is pressed by a device (not shown in drawing) such as a press (Refer to FIG. 6A).

Whereupon the upper mold 15 lowers along the guide rods 17, approaching the lower mold 12. When still further pressure is applied, the rubber mounts 13 and 16 compress, the press-in member 19a of the upper mold 15 presses the upper side of the hollow shaft member 1. The press-in members 19b and 19c of the lower mold 12 presses the lower side of the hollow shaft member 1 due to their resilient force and as a result, a part of the hollow shaft member 1 is crimped inward (Refer to FIG. 6B).

At this point the inner side of the end member 2 of a pressed portion of the hollow shaft member 1 is pressed by pressure and deforms. Conversely, other portions cause a plastic type deformation and this flow expands outwards in the sealed off space so that the hollow shaft member 1 expands outward. This plastic type deformation occurs easily in the end member 2 since it is made of soft metal such as aluminum or brass.

When this expansion is excessive, the yield point of the hollow shaft member 1 is exceeded and problems occur. This expansion of the hollow shaft member 1 is however held within a specified range by the lower mold 12 and the upper mold 15.

This range is within the range of radial increase of the hollow shaft member 1 as expressed by the internal radial expansion δ as:

$$\delta = a/t \cdot P/E$$

This permits the deformation of the hollow shaft member 1 to be held within the limits of resilient deformation. As a result, the stress occurring in the hollow shaft member 1 restores resiliency, tightens the end member 2 subjected to plastic type deformation. These factors result in a strong coupling between the hollow shaft member 1 and the end member 2 (Refer to FIG. 6C).

The strong coupling occurring at this time between the hollow shaft member 1 and the end member 2 is also due to the strong stress exerted by in the hollow shaft member 1 which is made of hard material.

In addition, the circular holes 12b and 15b in the lower mold 12 and the upper mold 15 are formed beforehand to maintain ample dimensional precision. The dimensional precision of the hollow shaft member 1 is also satisfactory so that sufficient concentricity is maintained.

FIG. 7 is a bottom view of the joined condition after pressing by the frame mold unit 10. The reference numeral 3 denotes the portion of the hollow shaft member 1, which is crushed by pressure.

In the invention as described above, even if the dimensional precision for the inner diameter of the hollow shaft member, and the outer diameter of the end member are extremely rough, the manufacturing method of this invention allows a finish of high dimensional precision, achieves accurate concentricity and eliminates the drawback that the end member tends to attach crookedly along the longitudinal axis of the conventional hollow shaft members.

Further, in the process of this invention, the end member may be fit into the hollow shaft member and stress applied on the frame mold unit 10 by a press or other device. The process is easy to perform and eliminates the drawback that the conventional method for drilling a pin insertion hole and press-fitting a stop pin is complicated and has numerous job steps.

The deformation caused on the hollow shaft member is limited to the range of resilient deformation and the resilient strain of the hollow shaft member acts to strengthen the tightening of the end member so that a strong coupling is obtained between the hollow shaft member and end member, enabling the coupling to withstand vibrations and loads.

DESCRIPTION OF THE PREFERRED EMBODIMENT

Figure 1:
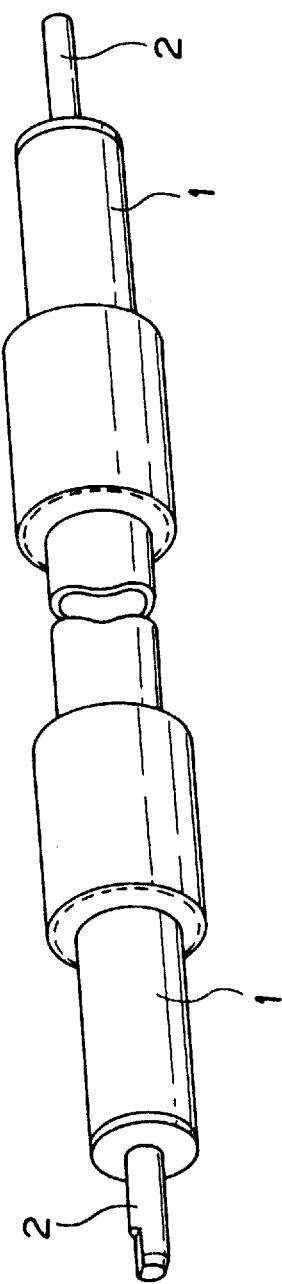
FIG. 1 is a fragmentary broken perspective view of a hollow shaft member of the invention.
Figure 2:
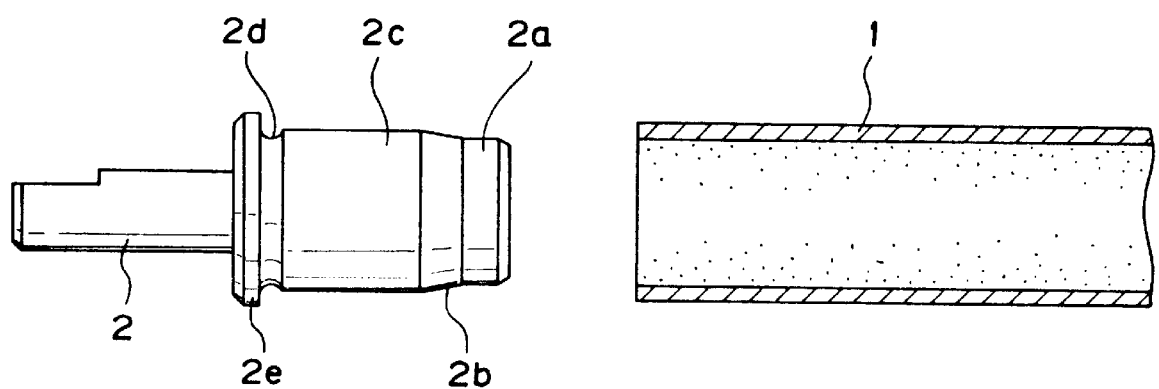
FIG. 2 is an enlarged fragmentary side view of a hollow shaft member, prior to press-fit of an end member.
Figure 3:
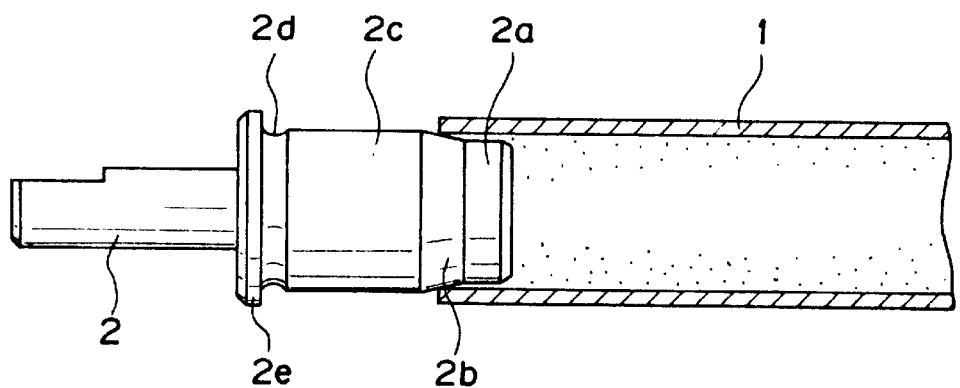
FIG. 3 is an enlarged fragmentary side view of a hollow shaft member, just prior to press-fit of an end member.
Figure 4:
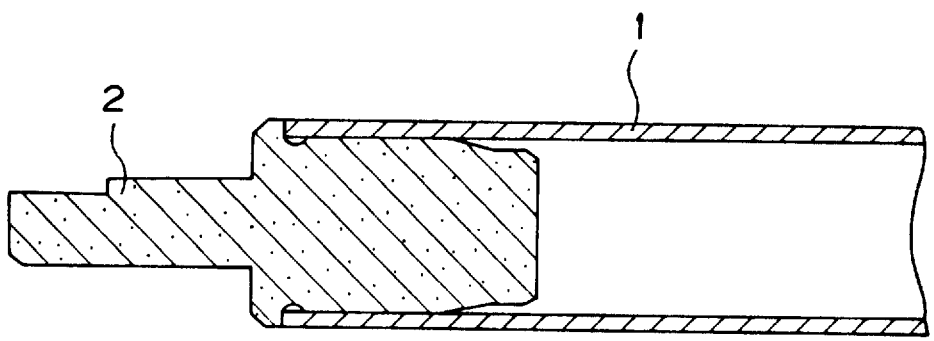
FIG. 4 is an enlarged fragmentary side view of a hollow shaft member after press-fit of an end member.
Figure 5:
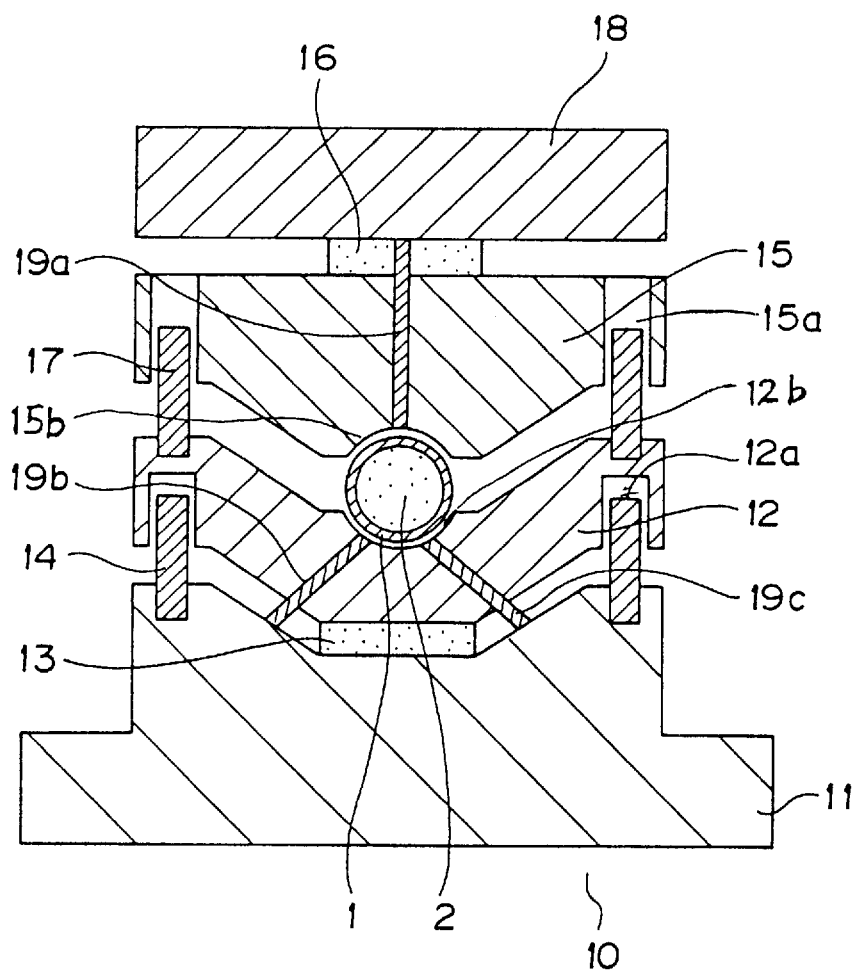
FIG. 5 is a cross sectional front view of a frame mold unit.
Figure 6A:
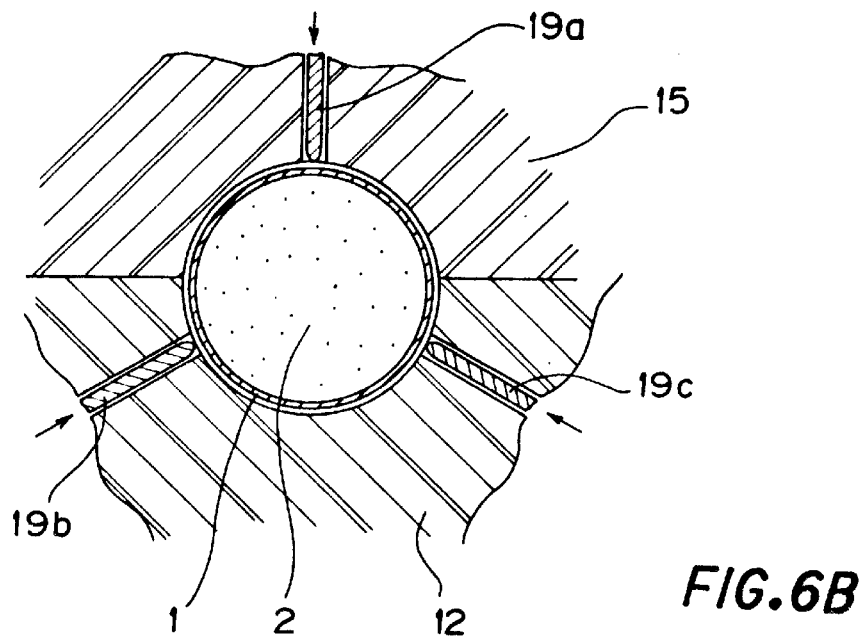
FIG. 6A is a partial broken and longitudinal cross sectional front view showing the state of the shaft member with the end member, just prior to pressing by means of the frame mold unit.
Figure 6B:
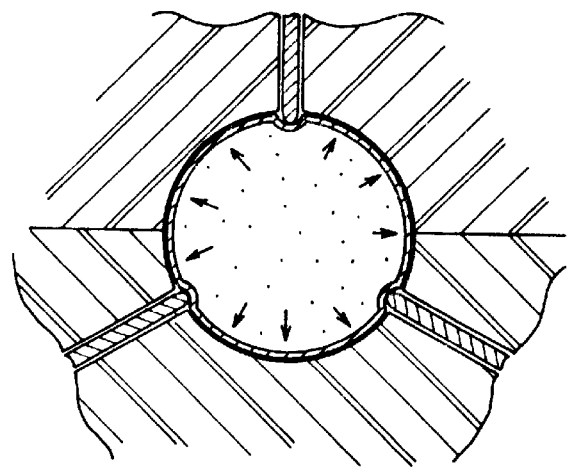
FIG. 6B is a partial broken and longitudinal cross sectional front view showing the state of the shaft member with the end member, during pressing by means of the frame mold unit.
Figure 6C:
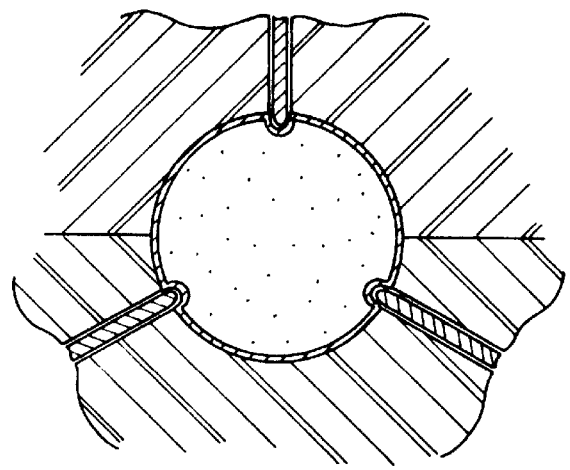
FIG. 6C is a partial broken and longitudinal cross sectional front view showing the state of the shaft member with the end member, after pressing is complete by means of the frame mold unit.
Figure 7:
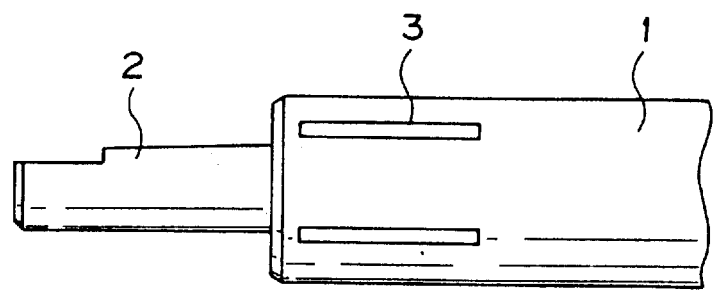
FIG. 7 is a fragmentary bottom view of the hollow shaft member after pressing by means of the frame mold unit.
Figure 8:
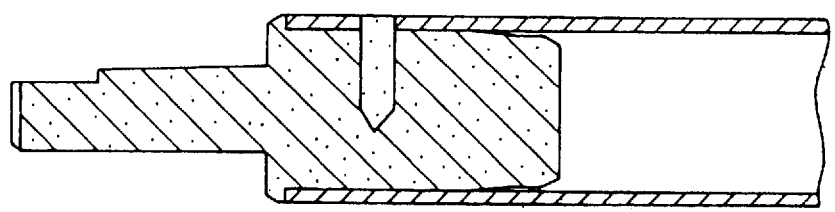
FIG. 8 is a fragmentary longitudinal cross sectional side view of the conventional method.

With a hollow shaft member material quality of SUS304, an internal radius of a=4.5 mm and a thickness of t=0.5 mm, the internal radial expansion within the resilient range of the hollow shaft member was calculated as follows. For the thin-walled cylinder having internal pressure P and circular strain σ, $$\sigma = P \cdot a/t$$

a: shaft internal radius t: shaft wall thickness
When the yield point of the SUS304 steel is then set at 206 MPa or more, the internal pressure for the yield point is calculated as follows P=206×0.5/4.5=22.9 (MPa)
The internal radial expansion δ for this internal pressure is given by:

$$\begin{aligned}
\delta &= a^2/t \cdot P/E(1-\nu/2) \\
&= 4.5^2/0.5 \times 22.9/197 \times 10^3 (1 - 0.34/2) \\
&\quad (E: 197 \times 10^3 \; \nu: 0.34) \\
&\approx 0.003907 \approx 3.9 \times 10^{-3} \text{ mm})
\end{aligned}$$

Therefore, the internal above expansion δ for the hollow shaft member under the above conditions is:

$$\delta = 3.9 \times 10^{-3} \text{ mm}$$

What is claimed is:

1. A manufacturing method for a hollow shaft member for office automation product comprising the stops of:

inserting an end member of soft metal into the inner wall end of a hollow shaft member formed of hard metal and, pressing a portion of said hollow shaft member into the end member to concurrently deform said end member, and concurrently expand said hollow shaft member at the outer side of said end member within a range such that the internal radial expansion δ is:

$$\delta = a^2/t \cdot P/E(1-\nu/2)$$

where, a: shaft internal radius

P: internal pressure

ν: Poisson's ratio t: shaft thickness

E: Young's modulus.

* * * * *